United States Patent [19]

Zibell

[11] Patent Number: 4,919,941

[45] Date of Patent: Apr. 24, 1990

[54] CHEWING GUM CONTAINING DELAYED RELEASE PROTEIN SWEETENER AND METHOD

[75] Inventor: Steven E. Zibell, Blue Island, Ill.

[73] Assignee: Wm. Wrigley Jr. Company, Chicago, Ill.

[21] Appl. No.: 198,138

[22] Filed: May 24, 1988

Related U.S. Application Data

[63] Continuation-in-part of Ser. No. 134,948, Dec. 18, 1987, which is a continuation-in-part of Ser. No. 921,754, Oct. 22, 1986, abandoned.

[51] Int. Cl.$^5$ .............................................. A23G 3/30
[52] U.S. Cl. ......................................... 426/5; 426/96; 426/548; 426/576; 426/303; 426/804
[58] Field of Search ............... 426/548, 804, 576, 658, 426/96, 3, 302, 303

[56] References Cited

U.S. PATENT DOCUMENTS

| | | | |
|---|---|---|---|
| Re. 29,682 | 6/1978 | Cella et al. | 426/548 |
| 3,262,788 | 7/1966 | Swanson et al. | 99/199 |
| 3,753,739 | 8/1973 | Cella et al. | 99/141 |
| 3,922,354 | 11/1975 | Galluzzi et al. | 426/96 |
| 3,928,633 | 12/1975 | Shoaf et al. | 426/96 |
| 3,956,507 | 5/1976 | Shoaf et al. | 425/96 |
| 3,962,468 | 6/1976 | Pischke et al. | 426/96 |
| 4,004,039 | 1/1977 | Shoaf et al. | 426/548 |
| 4,059,706 | 11/1977 | Pischke et al. | 426/548 |
| 4,139,639 | 2/1979 | Bahoshy et al. | 425/3 |
| 4,230,687 | 10/1980 | Sair et al. | 424/22 |
| 4,269,860 | 5/1981 | Ogawa et al. | 426/5 |
| 4,384,004 | 5/1983 | Cea et al. | 426/3 |
| 4,384,005 | 5/1983 | McSweeney | 426/250 |
| 4,495,213 | 1/1985 | Wolf et al. | 426/548 |
| 4,497,835 | 2/1985 | Winston | 426/72 |
| 4,517,214 | 5/1985 | Shoaf et al. | 426/548 |
| 4,554,167 | 11/1985 | Sorge et al. | 426/285 |
| 4,556,565 | 12/1985 | Arima et al. | 426/3 |
| 4,562,076 | 12/1985 | Arnold et al. | 426/5 |
| 4,568,560 | 2/1986 | Schobel | 427/3 |
| 4,579,747 | 4/1986 | Sugiyama et al. | 426/548 |
| 4,597,970 | 7/1986 | Sharma et al. | 426/5 |
| 4,634,593 | 1/1987 | Stroz et al. | 426/5 |
| 4,642,235 | 12/1987 | Reed et al. | 426/5 |

FOREIGN PATENT DOCUMENTS

| | | |
|---|---|---|
| 675004 | 11/1963 | Canada . |
| 86810619 | 7/1987 | European Pat. Off. . |
| 87300375 | 7/1987 | European Pat. Off. . |
| 87301903 | 9/1987 | European Pat. Off. . |
| 59-95862 | 12/1984 | Japan . |
| 58157509 | 4/1986 | Japan . |
| 1274905 | 5/1972 | United Kingdom . |
| 1301770 | 1/1973 | United Kingdom . |

*Primary Examiner*—Jeanette Hunter
*Attorney, Agent, or Firm*—Willian Brinks Olds Hofer Gilson & Lione

[57] ABSTRACT

The present invention is a method for producing a chewing gum with a delayed release protein sweetener as well as the chewing gum so produced. The delayed release protein sweetener is obtained by forming an aqueous solution of gelatin and a protein sweetener selected from the group consisting of thaumatin and monellin. This solution is dried and particle sized to thereby produce sweetener-containing particles of a gelatin matrix. A quantity of these particles is mixed with a limited quantity of a solution of zein. Preferably, the zein is dissolved in water with a pH between about 11.5 and about 12.1. The quantity of the zein solution being added is limited to thereby produce a damp mix which is characterized as being dust free, non-flowing, and crumbly. The damp mix is dried and then particle sized to thereby produce zein-coated sweetener-containing particles within a predetermined particle size range, which particles are added to a chewing gum formulation.

25 Claims, 2 Drawing Sheets

CHEWING GUM CONTAINING DELAYED RELEASE PROTEIN SWEETENER AND METHOD

CROSS-REFERENCE TO RELATED APPLICATIONS

The present application is a continuation-in-part of U.S. patent application Ser. No. 134,948 filed Dec. 18, 1987 which application is in turn a continuation-in-part of U.S. patent application Ser. No. 921,754, filed Oct. 22, 1986 now abandoned by the same inventor and assigned to the same assignee. The entire disclosure of both of these parent applications is incorporated herein by reference.

BACKGROUND OF THE INVENTION

The present invention relates to methods for producing chewing gum. More particularly, the invention relates to methods for producing chewing gum containing protein sweeteners which have been treated to produce a delayed release when the gum is chewed.

Thaumatin is an example of a protein sweetener. The sweetness of thaumatin is about 2,000 to 3,000 times sweeter than sucrose on a weight basis, thus making it one of the sweetest known substances. Thaumatin is obtained from the fruit of the tropical plant *Thaumatococcus daniellii* Benth. of the family Marantaceae. This plant is found in various parts of tropical Africa and has a tetrahedral fruit approximate 4 cm in diameter. Thaumatin can be extracted by the procedures described by van der Well and Loeve, in *Eur. J. Biochem.* 31 pp. 221-5, (1972) as modified by the teachings of British Pat. No. 1,501,409 and British patent appln. No. 2,015,533A Thaumatin is commercially available from the TATE AND LYLE INDUSTRIES, LTD. of Reading, Berkshire, England Monellin is another example of a protein sweetener with about half the sweetness potential of thaumatin. Monellin is obtained from the fruit of the tropical plant *Dioscoreo-phyllum cumminsii* Diels., of the family Menispermaceae. The plant and berries have become known as "Guinea Potato" or "Serendipity Berry." The plant can be found in forests of tropical West Africa and bears grape-like clusters of red berries about 10 mm in diameter. Monellin can be extracted by the procedure described by J.A. Morris et al *J. Biol. Chem.* 248 (2), 543-9 (1973); or by van der Wel, *F.E.B.S. Letters* 21(1), 88-90 (1973); or in British Pat. No. 1,337,086.

It has previously been proposed to use thaumatin and monellin to enhance and/or extend the sweetness and/or flavor of chewing gum formulations. One problem which has hindered their use in chewing gum is that the full sweetness and flavor potential of these sweeteners is not realized when they are incorporated in chewing gum. It is currently believed that this phenomenon is caused by a tendency for the sweeteners to become bound up in the gum base, and thus not fully released from the gum during chewing. Added to this is the fact that these sweeteners are extremely costly.

This problem was addressed in U.S. Pat. No. 4,562,076 assigned to the assignee of the present application. According to this patent, the thaumatin and/or monellin is incorporated in a rolling compound for the gum. U.S. Pat. No, 4,642,235 also assigned to the same assignee, describes a method wherein thaumatin or monellin is incorporated into the liquid of a liquid center-filled chewing gum product.

Another problem which has hindered the use of thaumatin or monellin in chewing gum is the fact that since each has such a high sweetness potential, the release of the sweetener during chewing must be delayed in order to avoid an overpowering sweetness and flavor burst upon initial chewing, and to provide for longer lasting sweetness.

In recent years, efforts have been devoted to delaying the release of sweeteners and flavors in various chewing gum formulations. Similarly, efforts have been directed at protecting high-potency sweeteners within the chewing gum formulation, to thereby increase the shelf-stability of the ingredient, i.e. the protection against degradation of the high-potency sweetener over time.

For example, U.S. Pat. No. 4,597,970 to Sharma et al., teaches a process for producing an agglomerated sweetener wherein the sweetener is dispersed in a hydrophobic matrix consisting essentially of lecithin, a glyceride, and a fatty acid or wax having a melting point between 25 and 100° C. The method disclosed uses a spray congealing step to form the sweetener-containing matrix into droplets followed by a fluid bed second coating on the agglomerated particles.

U.S. Pat. Nos. 4,515,769 and 4,386,106, both to Merrit et al., teach a two step process for preparing a delayed release flavorant for a product such as chewing gum. In this process, the water insoluble flavorant, such as an essential oil, is prepared in an emulsion with a hydrophyllic matrix, such as gelatin or gum arabic The emulsion is dried and ground and the particles are then coated with a water impermeable substance, such as shellac or zein.

U.S. Pat. No. 4,230,687, to Sair et al., teaches a process for encasing an active ingredient to achieve gradual release of the ingredient in a product such as chewing gum. The method described involves adding the ingredient to an encapsulating material in the form of a viscous paste. High shear mixing is used to achieve a homogeneous dispersion of the ingredient within the matrix which is subsequently dried and ground.

U.S. Pat. No. 4,139,639, to Bahoshy et al., teaches a process of "fixing" aspartame by co-drying (by spray drying or fluid bed coating) a solution containing aspartame and an encapsulating agent, such as gum arabic, to thereby surround and protect the aspartame during storage in the gum.

U.S. Pat. No. 4,384,004, to Cea et al., teaches a method of encapsulating aspartame with various solutions of encapsulating agents using various encapsulation techniques such as spray drying in order to increase the shelf-stability of the aspartame.

U.S. Pat. No. 4,634,593 to Stroz et al., teaches a method for producing controlled release sweeteners for confections, such as chewing gum. The method taught therein involves the use of an insoluble fat material which is mix mulled with the sweetener.

Naturally, the processes which use spray drying or fluid bed techniques for encapsulating the ingredients involve a relatively large investment in equipment and require skilled operating personnel and sophisticated process controls.

U.S. Pat. 4,292,336 to Latymer et al. describes a process for increasing the heat stability of thaumatin. In this process, the thaumatin is mixed with gelatin at a weight ration of gelatin to sweetener of less than 100:1.

Another problem which has hindered the use of the thaumatin in chewing gum involves the fact that it can have undesirable flavor off-notes. In particular, at certain levels thaumatin is known to have a licorice offnote.

Yet another factor which has hindered the use of thaumatin in chewing gum is the fact that thaumatin is a powder with a low density and has been known to produce an allergic reaction when breathed by certain individuals. Thus, health problems can be created for the workers involved in the chewing gum production if thaumatin is added to the chewing gum formulation neat.

SUMMARY OF THE INVENTION

The present invention is a method for producing a chewing gum with a delayed release protein sweetener as well as the chewing gum so produced The delayed release protein sweetener is obtained by forming an aqueous solution of gelatin with a protein sweetener selected from the group consisting of thaumatin and monellin as well as mixtures thereof. This aqueous solution is then dried and particle sized to obtain sweetener-containing particles of a gelatin matrix. These particles are then mixed with a limited quantity of a zein solution. The quantity of the zein solution being added is limited to thereby produce a damp mix which is characterized as being dust free, non-flowing, and crumbly. The damp mix is dried and then particle sized to thereby produce zein-coated sweetener-containing particles within a predetermined particle size range. The particles are then added to a chewing gum formulation.

In accordance with a first preferred method of the present invention, the protein sweetener is thaumatin. The thaumatin is mixed with gelatin in an aqueous solution and then dried and ground. Also in this preferred embodiment, the zein solution is an aqueous solution with a pH of between about 11.5 and about 12.1 and contains between about 13 and about 18 weight percent zein. This aqueous zein solution is added in an amount between about 30 and about 70 percent by weight of the gelatin contained thaumatin particles to be treated. In other terms, the final zein-coated thaumatin-containing particles are preferably between about 10 and about 50 weight percent zein. In this embodiment, the chewing gum made is a mint flavored gum with between about .01 and about 0.10 weight percent of the coated thaumatin.

In accordance with a second preferred method of the present invention, the zein is dissolved in ethanol to between about 10 and about 50 percent by weight of the solution. This ethanol solution is added to the gelatin contained particles of thaumatin in an amount of between about 25 and about 75 of the damp mix. After drying and grinding, the zein-coated particles are between about 10 and about 35 percent by weight zein.

The present invention is advantageous in that it has been found to achieve a highly desirable release profile for protein sweeteners in chewing gum. In particular, it has been found that the present invention can be used to avert an overpowering sweetness burst and also to provide a perceptible release of protein sweetener over at least 10 minutes The invention has also proved advantageous when used with thaumatin in that it has been observed that the licorice flavor off-note is somehow suppressed when the thaumatin is first mixed with gelatin and then coated with zein.

The embodiment which uses an aqueous solution of zein offers the advantage that a zein coating can be applied to the protein sweetener in a chewing gum without resorting to the use of ethyl alcohol as the solvent. This reduces the cost of using zein. That is, when using zein in an aqueous solution as opposed to ethyl alcohol, there is no danger of explosion, fire, or toxic effects.

The present invention is also advantageous in that it provides a relatively simple and inexpensive method for treating protein sweeteners to produce a delayed release in chewing gum. In particular, the method of the present invention can be carried out in a relatively short time and using relatively simple and inexpensive equipment.

Although the present invention may be carried out in a continuous process, it is also well suited for batch processing. This is particularly advantageous in view of the small quantities of the protein sweeteners typically used for chewing gum formulations.

As mentioned above, thaumatin and monellin can be used both as sweeteners and as flavor enhancers. Accordingly, it should be noted that the phrase "protein sweetener" is intended to refer to thaumatin and monellin which can be used in either one or both of these capacities. That is, the thaumatin and monellin treated according to the present invention are not limited to being used as sweeteners, but can also be used as flavor enhancers.

It should also be noted that the phrase "delayed release" as used in this application is intended to refer to a delayed release of the protein sweetener during chewing of the gum as well as the delayed, or prevented, release of the protein sweetener in the chewing gum during storage, i.e. protecting the ingredient from the other components of the chewing gum during storage.

It should further be noted that the phrases "solution of zein" and "zein solution" are used in this specification and appended claims is intended to refer to a mixture of zein and solvent wherein either the zein is completely dissolved, or wherein a major portion of the zein is dissolved and the remaining minor portion is suspended in the solvent.

These advantages and features of the present invention as well as others will become apparent from the following description which, when taken in conjunction with the accompanying figures, discloses presently preferred methods of the present invention.

DETAILED DESCRIPTION OF THE PREFERRED EMBODIMENTS

Figure 1:
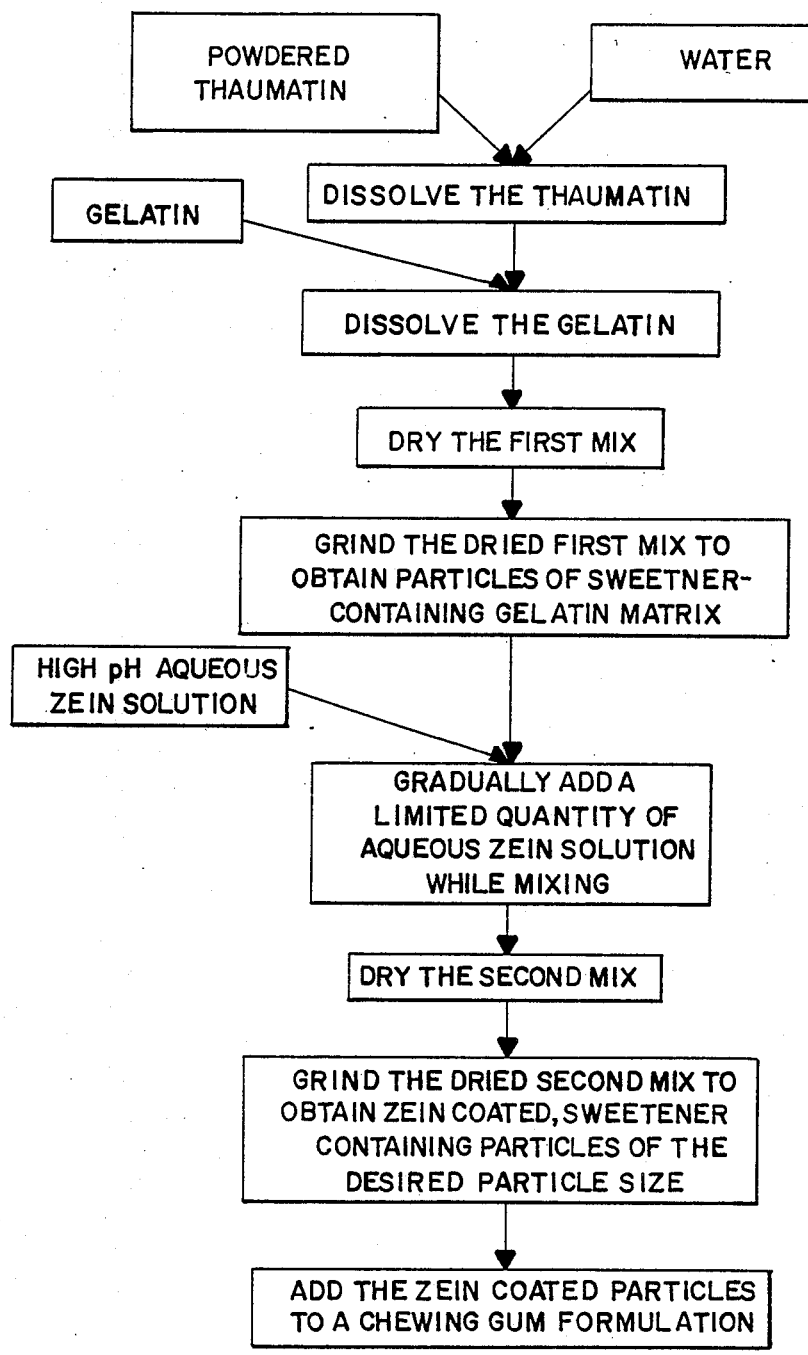
FIG. 1 is a schematic representation of a first preferred method of the present invention.

Referring to the drawings, FIG. 1 is a block diagram illustrating the steps in the process of a first preferred embodiment of the present invention. First, an aqueous solution of gelatin and a protein sweetener is prepared.

The protein sweetener used in the present invention is either thaumatin or monellin. Preferably, the sweetener is thaumatin. Most preferably, the thaumatin used is that manufactured and sold by TATE AND LYLE under the designation "TALIN." This form of thaumatin consists of an odorless, cream colored, proteinaceous, low density powder.

Alternatively, monellin can be used as the protein sweetener of the present invention.

Preferably, the thaumatin is added to water and mixed before addition of the gelatin. In accordance with the preferred embodiment shown, the thaumatin is added to between about 0.5 and about 25 weight percent of the water. More preferably, the thaumatin is added to between about 5 and about 15, most preferably between about 7 and about 13.

After the thaumatin is dissolved in the water, gelatin is added to the water. Preferably, the gelatin used has a Bloom strength greater than about 50, more preferably, greater than about 100. Most preferably, the gelatin used in the invention is a gelatin obtained from GRAYSLAKE CO. and has a Bloom strength of about 300.

The gelatin is preferably added to between about 1 and about 60 weight percent of the water, more preferably between about 10 and about 50, and most preferably between about 20 and about 40. Stated another way, the preferred aqueous gelatin/thaumatin solution is between about 25 and about 35 weight percent gelatin, and between about 3 and about 15 weight percent thaumatin, with the balance being water.

After the gelatin is added, the solution is mixed for a time sufficient to ensure complete solution of the gelatin. Typically, the mixing is continued for about 60 minutes. Preferably, the solution is heated to about 140° F. to facilitate solution and subsequent settling of the gelatin.

After mixing, the aqueous gelatin/thaumatin solution is dried. Preferably, the drying is accomplished by spreading a thin layer of the solution and then drying in a convection oven at about 100° F. for about 14 hours. After this length of drying, the gelatin matrix will typically contain about 9 weight percent moisture. Spreading the solution in a thin layer is important to achieve efficient drying.

After drying, the mix is then particle sized, preferably by use of a Fitzmill grinder with a 0.04″ screen. Alternatively, means such as a roller mill and the like can be used to particle size the sweetener-containing matrix. Other comminuting devices can also be used.

At this point, the thaumatin-containing particles of the gelatin matrix are ready to be coated with zein. It is noted here that the use of a gelatin matrix to contain the thaumatin has been observed to facilitate the release of the thaumatin from the chewing gum during chewing. That is, the gelatin contained thaumatin is released from the chewing gum matrix better than neat thaumatin. In particular, comparisons of a chewing gum formulation with gelatin contained thaumatin against formulations with untreated thaumatin showed that the gelatin contained thaumatin produced a flavor enhancement equal to that produced by eight times as much untreated thaumatin in an otherwise identical formulation.

Unfortunately, however, it was found that this gelatin contained thaumatin was released from the gum too quickly during chewing. In particular, the gum produced with gelatin contained thaumatin produced an undesirable flavor burst within the first minute or two of chewing.

According to the preferred embodiment shown in FIG. 1, an aqueous solution of zein is prepared.

Zein is a protein of the prolamine class derived from corn. Typically, zein is obtained in a powdered form and is yellow, almost tasteless and generally known to be insoluble in water while soluble in alcohols. In the most preferred embodiment, the zein is obtained from the FREEMAN COMPANY.

Zein has been known in the past to be used as a coating material. However, in these uses, the zein was typically dissolved in ethyl alcohol. Naturally, the use of ethyl alcohol requires the installation of additional equipment to reduce the danger from explosions, fire, or toxic effects.

This first embodiment avoids these problems by using zein in an aqueous solution An aqueous solution of zein is made possible by virtue of the fact that the aqueous solution is maintained at a relatively high pH, i.e. between about 11.5 and about 12.1. In this pH range, it has been found that the zein is significantly more soluble than in neutral water. Typically, when mixed with neutral water, zein powder will float on the top of the water without any appreciable solution, or even suspension of the zein within the water. Accordingly, it is not possible to coat particles with a solution of zein in neutral water.

In contrast, when mixed into water which has a pH between about 11.5 and 12.1, it is possible to get significant solution and suspension of zein particles within the water. In particular, it has been found that an aqueous solution of zein can be formed which contains up to 20 percent by weight zein. At this 20 percent level, substantially all of the zein is solvated with only a minor fraction being suspended within the solution.

The aqueous solution of zein is prepared by adding the desired amount of zein to a quantity of water along with an amount of base sufficient to create a pH between about 11.5 and about 12.1. Preferably, sodium hydroxide is added to the water in sufficient quantity to create a pH between 11.6 and 11.9. Alternatively, other food acceptable bases can be used.

Preferably, the zein solution should be made with a zein content between about 5 and about 20 percent by weight. More preferably, the zein content will be between about 13 and about 18 percent by weight, most preferably about 16 percent by weight. As noted above, this zein content is higher than would be available without the high pH level of the water.

Referring again to FIG. 1, a quantity of thaumatin-containing particles of gelatin matrix is added to the bowl of a planetary type mixer It is also contemplated within the present invention to combine a bulking agent with the highpotency sweetener before it is coated by the present process. This is particularly desirable when working with a protein sweetener such as thaumatin or monellin which have such a high sweetness per gram ratio.

It is further contemplated within the present invention to combine a flavoring agent with the protein sweetener at some point in the process In this way, it is possible to produce zein-coated particles that will produce a delayed release of both a protein sweetener and an independent flavor when the gum is chewed.

Referring again to the preferred embodiment illustrated in FIG. 1, a limited amount of the zein solution is added to the gelatin contained protein sweetener in the mixing bowl. The amount of zein solution added will depend on the zein content of the solution and the desired amount of zein to be coated on the zein-coated protein sweetener at the conclusion of the process.

Also, the amount of zein solution is intentionally limited so as to produce a damp, dust-free, non-flowable, non-extrudable, crumbly mixture. By the word "crumbly" it is meant that the damp mix easily separates from itself. By way of comparison, the damp mix should have the consistency and texture of wet sand. By way of contrast, the damp mix should not have so much solution that it becomes dough-like, paste-like, clay-like, or soup-like. It has been found that, if the mix does go to the dough-like stage, many of the advantages of the present invention are lost. In particular, the dough-like mix is more difficult to mix, handle, and dry and considerably more difficult to achieve the desired particle sizes.

The preferred method of adding the zein solution to the gelatin contained protein sweetener is to add it in small amounts in time spaced increments while continuously mixing. When adding the solution this way, it is desirable to allow the mix to become homogeneous before the next addition of solution. In following this preferred method, the solution is allowed to be absorbed slowly into the mixture without producing pools of solution which can result in large clay-like lumps in the mixture.

It has been found that one method of determining when there is sufficient solution added is to monitor the power demand for the mixer. In particular, the power demand increases dramatically as the mix goes from the desired damp mix stage to a dough-like stage. This is believed to be due to the fact that, in the desired damp mix stage, the mix is crumbly, i.e. easily separable; whereas when the mix moves into the clay-like stage, the mix become more cohesive. As a result, the power demand on the mixer can be monitored and the solution addition stopped just as the power demand begins a sharp rise.

It is also possible to determine the proper amount of solution to add by visually monitoring the condition of the damp mix. The characteristics mentioned above, namely dust-free, non-flowable, and crumbly, are relatively easy to observe and contrast with the cohesiveness, and flowability of the dough-like stage.

Naturally, once the optimum amount of solution is determined for a particular zein content level and a particular weight ratio of zein to protein sweetener, that optimum amount of solution will be reproducible.

In the preferred embodiment represented in FIG. 1, the zein solution is added so as to comprise between about 30 and about 80 percent by weight of the damp mix, more preferably between about 40 and about 70 percent, and most preferably about 60 percent.

In selecting the relative proportion of zein to protein sweetener in the final product, some factors to consider are the specific protein sweetener selected and the release profile or shelf-stability which is being sought for the zein-coated sweetener in the particular chewing gum. Generally, using more zein will result in a longer delayed release of the protein sweetener when the gum is chewed.

Naturally, the amount of zein should be kept below the level at which it would adversely affect the texture of the chewing gum. Preferably, the zein will comprise between about 5 and about 35 by weight percent of the zein-coated gelatin contained protein sweetener, i.e. percent by combined weight of the protein sweetener, the gelatin, and the zein. In the most preferred embodiment, the zein is added to between about 10 and about 30 percent by total weight, even more preferably between about 15 and about 25 percent.

After the last of the solution is added, the mixture is continuously mixed for a time sufficient to produce a homogenous mass.

The type of mixing affected on the mix is believed to be important to the present invention. In particular, it is believed that a compressive type mixing is important in order to push the solvated zein and the particles of gelatin contained protein sweetener together into clusters. This is contrasted with a high shear type mixing which would act to separate the components of the damp mix. Accordingly, the preferred type of mixer is a planetary mixer or other type mixer that would give similarly compressive type mixing.

After the final mixing, the damp mix is dried. Preferably, substantially all of the water will be removed from the mix. The drying is preferably accomplished by taking the damp mix out of the mixer bowl and spreading it on drying trays. It been found preferable to line the drying trays with paper to facilitate removal of the dried product. In the most preferred embodiment, the damp mix is spread on trays at a depth of about 1 to 2 cm.

Preferably, the drying is accomplished by placing the trays in a drying oven at a temperature and for a time sufficient to drive off substantially all of the water. Naturally, the temperature and time for drying will depend on the amount of water used in the mixture used as well as factors such as the thermal or moisture stability of the protein sweetener. Accordingly, it may be desirable to allow the damp mix to dry at ambient conditions. In the most preferred embodiment, the thaumatin coated with 15–17 weight percent zein is dried at about 100° F. for 16 to 20 hours.

After drying in this first preferred embodiment, the zein-coated sweetener-containing particles have been found to have a water content of between about 8 and 10 percent by weight of the total. The acceptable level of water left in the agglomerated protein sweetener particles may be higher or lower than this amount. A low moisture content generally facilitates grinding into the desired particles.

After drying, the mix is generally characterized as being in the form of hard, dry lumps of various shapes and sizes. At this point, the dry mix is ready to be treated to produce the desired range of particle sizes. This can be accomplished in various ways. Most preferably, the dried mix is fed into a grinder which comminutes the mix into smaller particles. Other devices such as a roller mill can also be used to comminute the dried mix. The grinder or other device is preferably equipped with a screen which will pass the desired particle size range. If desired, other techniques such as a second screen or a cyclone separator can be used to ensure a minimum particle size as well as a maximum particle size. Preferably, a screen with 0.04 inch holes is used to produce the zein-coated thaumatin particles of this first preferred embodiment.

In this preferred embodiment, only the maximum particle size is controlled. That is, the smaller particles are not held back. As a result, there may be small thaumatin-containing particles of gelatin matrix in addition to larger clusters of zein-coated particles. This result is believed to be preferable for protein sweeteners in certain gum formulations. In this preferred embodiment, this spectrum of sizes is believed to produce the effect of allowing some smaller and/or uncoated gelatin particles with the thaumatin to be released more quickly when the gum is chewed than the gelatin particles which are fully coated by zein and bound into clusters. As a result, the release profile is such that the consumer experiences sufficient sweetness initially and also subsequently.

In alternative embodiments, it may be desirable to control the maximum and the minimum particle size to produce a narrower range of particle sizes. This may be desired when it is intended for all of the protein sweetener to have a more uniform delayed release. In still other embodiments, it may be desirable to obtain particles within several narrow size ranges and then to blend these sizes to achieve the exact release profile desired.

At this point, the above-described zein-coated protein sweetener is ready to be incorporated into a chewing gum. The remainder of the chewing gum ingredients are seen to be noncritical to the present invention. That is, the zein coated particles of protein sweetener can be incorporated into conventional chewing gum formulations in a conventional manner.

The preferred chewing gum formulation is a sugar sweetened chewing gum to intensify, enhance and/or extend the sweetness and flavor thereof. Alternatively, the zein-coated protein sweeteners of the present invention can also be used in a sugarless gum to intensify, enhance and/or extend the sweetness of other non-caloric sweeteners. The zein coated protein sweetener may be used in either regular chewing gum or bubble gum.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew. In the preferred embodiment, the water soluble portion is a mixture of sorbitol and mannitol.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 17 to about 35 percent by weight of the gum.

The gum base typically also includes a filler component. The filler component such as calcium carbonate, magnesium carbnate, talc, dicalcium phosphate and the like. The filler may constitute between about 5 to about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the zein-coated gelatin contained protein sweeteners of the present invention will most preferably be used in sugar sweetened gum formulations to intensify, enhance, or extend the sweetness and flavor. However, sugarless formulations are also within the scope of the invention. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination.

The twice coated protein sweeteners of the present invention can also be used in combination with other sugarless sweeteners. Generally sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination.

Depending on the particular sweetness release profile and shelf-stability needed, the zein-coated protein sweeteners of the present invention can also be used in combination with uncoated protein sweeteners or with protein sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorally acceptable blend. All such flavors and flavor blends are contemplated by the present invention. Preferably, the chewing gum of the present invention is a mint flavored gum, most preferably spearmint. Alternatively, the chewing gum can be cinnamon flavored.

Optional ingredients such as colors, emulsifiers and pharmaceutical agents may be added to the chewing gum.

In general, chewing gum is manufacture by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The twice coated sweetener of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

Figure 2:
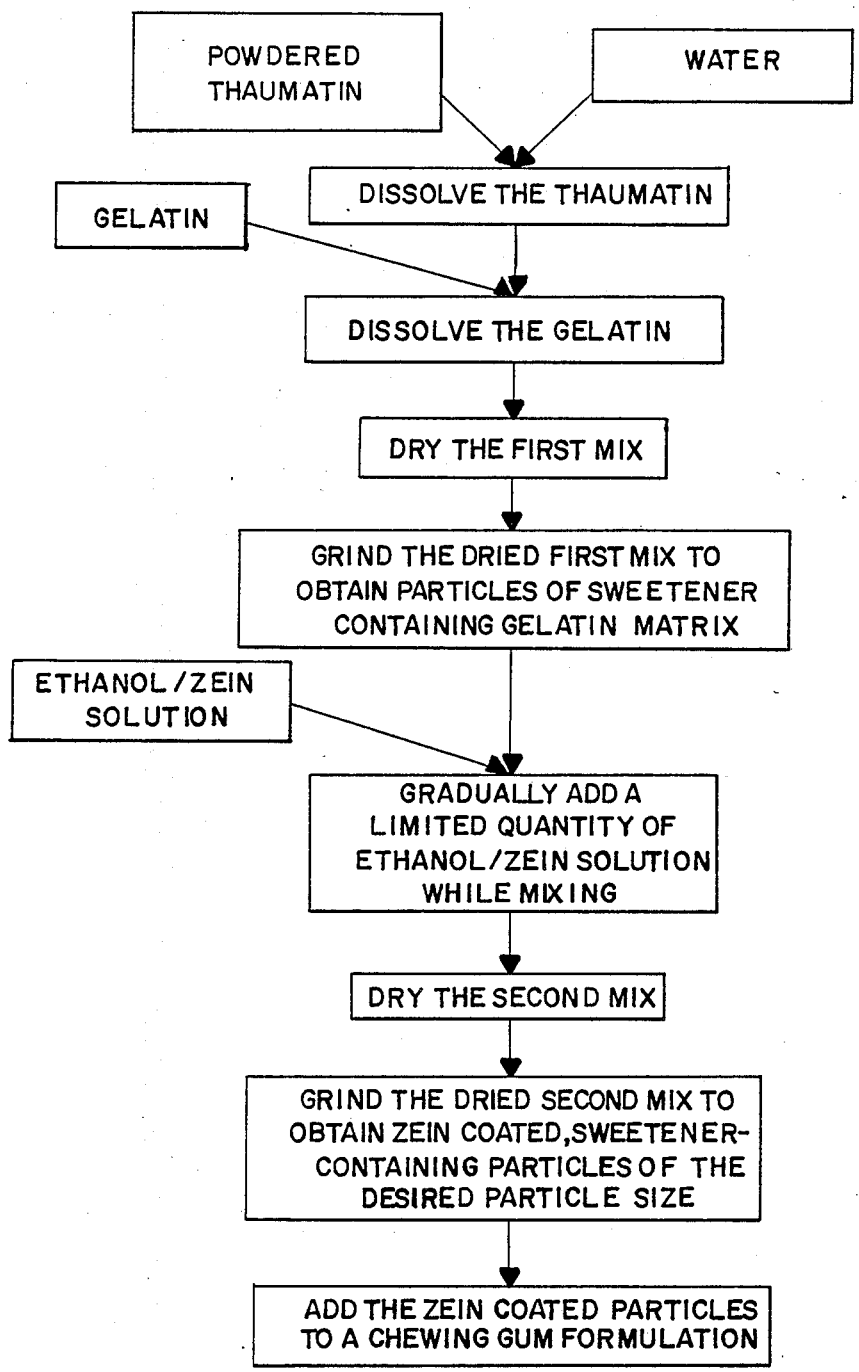
FIG. 2 is a schematic representation of an alternative embodiment of the present invention.

Referring now to FIG. 2, an other embodiment of the present invention is depicted. This embodiment is similar in all respects to that depicted in FIG. 1 with the exception that the zein is dissolved in ethanol rather than high pH water. In particular, the zein powder is dissolved in 95% pure food grade ethanol, such as that available from the AAPER Alcohol and Chemical Co. under the designation "Ethyl Alcohol—U.S.P. 95%, 190 Proof." Preferably, this ethanol/zein solution will be between about 10 and about 50 percent by weight zein, more preferably between about 20 and about 45, and most preferably about 35. The zein content of this ethanol solution may be varied depending on the amount of zein which is desired to be present in the final zein-coated particles of protein sweetener. In general, the ethanol/zein solution can be used to add about twice as much zein to the sweetener-containing particles. This is because the ethanol solution can hold a higher concentration of zein.

The amount of ethanol/zein solution which is added to the gelatin contained particles is preferably between about 25 and about 75 percent by weight of the damp mix, more preferably between about 30 and about 60, and most preferably about 42. As in the first preferred embodiment, the amount of zein solution is limited so as to produce a damp, dust-free, non-flowable, non-extrudable, crumbly mixture.

This damp mix is spread on trays as above and dried to remove substantially all of the ethanol. Naturally, the temperature and drying times are lower when ethanol is used. In particular, the drying temperature is set at about 100 to 110° F. and the mix is dried for about 12 hours.

After drying, the mixture is ground in a Fitzmill grinder with a 0.04" screen. At this point the zein-coated thaumatin-containing particles are ready to be added to a chewing gum formulation.

EXAMPLES

The following examples of the invention and comparative examples are provided by way of explanation and illustration and as such are not seen as limiting the scope of the invention.

Example 1 was carried out in accordance with the preferred embodiment shown in FIG. 1. In particular, 111.1 g. of thaumatin from TATE AND LYLE were placed into 1000.0 g. of water and stirred until completely dissolved. Then 475.2 of 300 Bloom gelatin was added and the mixture was heated to about 140° and continued to be mixed until the gelatin was completely dissolved. This gelatin thaumatin solution was poured onto a 24" by 20" tray and spread in a layer between about ⅛ to 1/16" thick. The tray was put in a convection oven at 100° F. at 35% R.H. for 6 hours. After drying the moisture content was about 9%. After drying, the product was ground in a Fitzmill grinder with a 0.04" screen.

An aqueous zein solution was prepared by adding enough NaOH to 850 g. of water to achieve a pH of 11.8. Then 150 g. of zein was added and mixed until substantially all dissolved.

Next, 250 g. of the gelatin contained particles produced above were put into the bowl of a Hobart mixer. While mixing, aliquots of the aqueous zein solution were added to the bowl until about 148 g. has been added. The damp mix that resulted was dustless and coalesced when squeezed. The damp mix was mixed for about 5 minutes after the last zein solution addition to insure complete interdispersion. At this point the damp mix consisted of about 4.4% thaumatin, about 19% gelatin, about 5.6% zein, and about 71% water.

The damp mix was transferred to stainless steel trays and spread to a depth of approximately 2 cm. The trays were placed in an oven and heated to 100 to 100° overnight. After drying the mix was ground in a Fitzmill at high speed while using a 0.04 inch screen. At this point, the zein-coated sweetener-containing particles consisted of about 14% thaumatin, 60% gelatin, 17% zein, and about 9% water.

The resultant zein-coated sweetener-containing particles were then added to a spearmint flavored chewing gum formulation with the ingredients and weight percentages listed below:

| | |
|---|---|
| Sugar | 52.0% |
| Base | 20.0% |
| Corn Syrup | 16.4% |
| Flavor (Spearmint) | 0.582% |
| Dextrose | 10.0% |
| Glycerine | 1.0% |
| Zein-coated thaumatin/gelatin particles | 0.018% |
| | 100.0% |

At a level of 0.018% particles, the thaumatin content of the chewing gum was 25 ppm. This chewing gum was compared for flavor enhancement against others as will be described below.

Example 2 was carried out the same as Example 1 except that less of the particles were added to the gum formulation. In particular, the particles were added to 0.012 weight percent so that the chewing gum included thaumatin at 17 ppm.

Example 3 was carried out the same as Example 1 except that the zein was added to the water before the addition of NaOH. After the zein was added, the pH was monitored and NaOH was added from time to time to maintain a pH of 11.8.

Example 4 was carried out the same as Example 1 with the exception that instead of an aqueous solution of zein, an ethanol solution with a different zein content was used. In particular, the ethanol/zein solution contained about 36.5 weight percent zein. The damp mix contained about 10% zein.

Comparative Example 5 was carried out to determine the difference between the present invention using uncoated thaumatin-containing particles of a gelatin matrix. In particular, the intermediate thaumatin-containing particles made in the first half of Example 1 were incorporated into the same chewing gum formulation in an amount so that the level of thaumatin would be the same as in Example 2, i.e. at a level of about 0.010 weight percent so that the thaumatin was present at about 17 ppm.

Comparative Example 6 was performed the same as Example 5 except that the level of gelatin contained thaumatin was selected so that the level of thaumatin was the same as in Example 1, i.e. the particles were added at a level of 0.015 weight percent so that the thaumatin was present at about 25 ppm.

Comparative examples 7-10 were carried out to determine the difference between chewing gums made according to the present invention and chewing gums made wherein the thaumatin was added neat. In particular, neat thaumatin was added to the same chewing gum formulation at various levels. Example 7 included thaumatin at 17 ppm. Example 8 included thaumatin at 34 ppm. Example 9 included thaumatin at 68 ppm. Example 10 included thaumatin at 136 ppm.

Comparative examples 11-13 were carried out to determine the difference between coating the thaumatin-containing particles of gelatin matrix with zein and coating it with another material.

In Example 11, the thaumatin-containing particles of gelatin matrix as produced in the first stage of Example 1 were taken and coated with hydroxypropyl methylcellulose sold by DOW under the designation "E4M" In particular, 18 g. of the gelatin matrix particles were added to the mixer. Next, 7.7 g. of E4M were added and the two powders were dry blended. Then water was added to the bowl while mixing. A total of 11 g. of water were added until the mix had the same general characteristics as described above. The mix was dried and ground as above. The resultant particles included 12.6% thaumatin, 69.8% gelatin, 9.9% E4M, and 4.0% water. The resultant particles were added to the same chewing gum formulation as described in Example 1. The level of the E4M coated particles was selected so as to achieve a thaumatin level of 17 ppm as in Example 2, i.e. the particles were added at 0.0135 weight percent.

In Example 12, the gelatin matrix particles were coated with maltodextrin. The maltodextrin was obtained from STALEY CO. under the designation "Maltrin 150". In particular, 19 g. of the gelatin matrix particles were added to the mixer. Next, 8.1 g. of the maltodextrin were added and the two powders were dry blended. Then water was added to the bowl while mixing. A total of 4 g. of water were added until the mix had the same general characteristics as described above. The mix was dried and ground as above. The resultant particles included 12.8% thaumatin, 54.8% gelatin, 29.8% maltodextrin, and 2.6% water. The resultant particles were added to the same chewing gum formulation as described in Example 1. The level of the Maltodextrin coated particles was selected so as to achieve a thaumatin level of 17 ppm as in Example 2, i.e. the particles were added at 0.0133 weight percent.

In Example 13, the gelatin matrix particles were coated with shellac. The shellac was obtained obtained in an ethanol solution designated "Certified Lac Glaze". In particular, 20 g. of the gelatin matrix particles were added to the mixer. Next, the shellac solution was added while mixing until a total of 3.75 g. had been added. The mix had the same general characteristics as described above. The mix was dried and ground as above. The resultant particles included 16.8% thaumatin, 71.9% gelatin, 8% shellac, and 3.3% water. The resultant particles were added to the same chewing gum formulation as described in Example 1. The level of the Maltodextrin coated particles was selected so as to achieve a thaumatin level of 17 ppm as in Example 2, i.e. the particles were added at 0.0101 weight percent.

To quantify the flavor enhancement effect of the products of the above-described examples, panels were used to evaluate each of the gums made.

The first panel compared Example 2 with Examples 5, and 7-10. The panel consisted of 10 members who chewed each of the 6 gums and then rated them at 0, 0.5, 1.0, 2.0, 3.0, 4.0, 6.0 and 8.0 minutes. The scale used went from 0 to 9 which values correspond to the sensory perception as follows:

| Talin Effect | Value |
| --- | --- |
| None | 0 |
| Low − | 1 |
| Low | 2 |
| Low + | 3 |
| Moderate − | 4 |
| Moderate | 5 |
| Moderate + | 6 |
| High − | 7 |
| High | 8 |
| High + | 9 |

Tabulation of the results of these ratings showed that the product of Example 2 had a flavor effect as high as the product of Example 10, i.e. thaumatin added neat at 136 ppm. Thus, it was seen that the thaumatin as treated by the invention was at least eight times as effective as thaumatin added neat.

The results also showed that the product of Example 5, i.e. the uncoated gelatin particles, showed an undesirable flavor burst in the first minute of chewing.

A second panel was used to compare the products of Examples 1, 6, and 11-13. It was found that the product of Example 1 showed the best flavor enhancement. In particular, it was observed that the product of Examples 6 and 11-13 showed a licorice flavor off-note which can be associated with the use of thaumatin. It was somewhat surprising to observe that this licorice flavor off-note was present in Example 6 wherein the gelatin was contained in an uncoated gelatin matrix, but was not present in Example 1 wherein the gelatin matrix was coated with zein. It was even more surprising to observe that the licorice flavor offnote was present in Examples 11-13 wherein the thaumatin was contained in a gelatin matrix coated by materials other than zein. In other words, it was surprising to note that only when the gelatin matrix particles were coated with zein was the licorice offnote absent.

In summary, a relatively simple and inexpensive process has been described for producing delayed release protein sweeteners for chewing gum. Although specific embodiments and examples have been described herein, it should be borne in mind that these have been provided by way of explanation and illustration and that the present invention is not limited thereby. Certainly modifications which are within the ordinary skill in the art to make are considered to lie within the scope of the invention as defined by the following claims, including all equivalents.

I claim:

1. A method of producing chewing gum containing a delayed release protein sweetener comprising the following steps:

forming an aqueous solution f gelatin and a protein sweetener selected from the group consisting of thaumatin and monellin as well as mixtures thereof, wherein the gelatin is present at between about 1 and about 60 percent by weight of the water;

drying said aqueous solution of protein sweetener and gelatin;

particle sizing said dried protein sweetener and gelatin to produce particles of a sweetener-containing gelatin matrix;

mixing a quantity of said sweetener-containing particles with a zein solution with a zein content between about 5 and about 50 percent by weight, the quantity of the zein solution being limited to that amount which will produce a damp mix which is dust free, non-flowing, and crumbly;

drying the damp mix;

particle sizing said dried mix to thereby obtain zein-coated sweetener-containing particles within a particle size range suitable for chewing gum; and adding a quantity of said zein-coated sweetener-containing particles to a chewing gum formulation.

2. The method of claim 1 wherein the protein sweetener is thaumatin.

3. The method of claim 2 wherein the thaumatin is added to between about 1 and about 25 percent by weight of the water in the aqueous solution of gelatin and protein sweetener.

4. The method of claim 2 wherein the thaumatin is added to between about 5 and about 15 percent by weight of the water in the aqueous solution of gelatin and protein sweetener.

5. The method of claim 1 wherein said zein is dissolved in water having a pH of between about 11.5 and about 12.1.

6. The method of claim 5 wherein the aqueous solution of zein has a zein content between about 5 and about 20 percent by weight.

7. The method of claim 5 wherein the aqueous solution of zein has a zein content between about 13 and about 18 percent by weight.

8. The method of claim 5 wherein the aqueous solution of zein has a pH between about 11.6 percent by weight.

9. The method of claim 5 wherein the aqueous solution of zein has a pH between about 11.6 and 11.9.

10. The method of claim 1 wherein the zein is dissolved in a alcohol.

11. The method of claim 1 wherein the zein is dissolved in ethanol.

12. The method of claim 11 wherein the ethanol solution of zein has a zein content between about 10 and about 50 percent by weight.

13. The method of claim 11 wherein the ethan0l solution of zein has a zein content between about 20 and about 45 percent by weight.

14. The method of producing chewing gum containing delayed release thaumatin comprising the following steps:

forming an aqueous solution of gelatin and thaumatin, wherein the gelatin is present at between about 1 and about 60 percent by weight by weight of the water;

drying said aqueous solution of protein sweetener and gelatin;

particle sizing said dried thaumatin and gelatin to produce particles of a thaumatin-containing gelatin matrix;

providing an aqueous zein solution with a pH between about 11.5 and about 12.1 and a zein content between about 5 and about 20 percent by weight;

mixing a quantity of said thaumatin-containing particles with said aqueous zein solution, the quantity of the zein solution being limited to that amount which will produce a damp mix which is dust free, non-flowing, and crumbly;

drying the damp mix;

particle sizing said dried mix to thereby obtain zein-coated thaumatin-containing particles within a particle size range suitable for chewing gum; and adding a quantity of said zein-coated thaumatin-containing particles to a chewing gum formulation.

15. The method of claim 14 wherein the thaumatin is added to between about 1 and about 25 percent by weight of the water in the aqueous solution of gelatin and protein sweetener.

16. The method of claim 14 wherein the thaumatin is added to between about 5 and about 15 percent by weight of the water in the aqueous solution of gelatin and protein sweetener.

17. The method of claim 14 wherein the aqueous solution of zein has a zein content between about 13 and about 18 percent by weight.

18. The method of claim 14 wherein the aqueous solution of zein has a zein content of about 16 percent by weight.

19. The method of claim 14 wherein the aqueous solution of zein has a pH between about 11.6 and 11.9.

20. The method of producing chewing gum containing delayed release thaumatin comprising the following steps:

forming an aqueous solution of gelatin and thaumatin, wherein the gelatin is present at between about 1 and about 60 percent by weight of the water;

drying said aqueous solution of protein sweetener and gelatin;

particle sizing said dried thaumatin and gelatin to produce particles of a thaumatin-containing gelatin matrix;

providing an alcohol zein solution having a zein content between about 10 and about 50 percent by weight;

mixing a quantity of said thaumatin-containing particles with said alcohol zein solution, the quantity of the zein solution being limited to that amount which will produce a damp mix which is dust free, non-flowing, and crumbly;

drying the damp mix;

particles sizing said dried mix to thereby obtain zein-coated thaumatin-containing particles within a particle size range suitable for chewing gum; and adding a quantity of said zein-coated thaumatin-containing particles to a chewing gum formulation.

21. The method of claim 20 wherein the thaumatin is added to between about 1 and about 25 percent by weight of the water in the aqueous solution of gelatin and protein sweetener.

22. The method of claim 20 wherein the thaumatin is added to between about 5 and about 15 percent by weight of the water in the aqueous solution of gelatin and protein sweetener.

23. The method of claim 20 wherein the alcohol solution of zein has a zein content between about 20 and about 45 percent by weight.

24. The method of claim 20 wherein the aqueous solution of zein has a zein content of about 35 percent by weight.

25. A chewing gum made according to the method of claim 1, 5, 11, 14 or, 20.

* * * * *